Oct. 10, 1950     E. W. HOLLIDAY     2,525,677

DIVIDING APPARATUS

Filed Sept. 29, 1947

Inventor
Edward William Holliday
by Stevens Davis & Miller
his attorneys

Patented Oct. 10, 1950

2,525,677

UNITED STATES PATENT OFFICE 2,525,677

DIVIDING APPARATUS

Edward William Holliday, Twickenham, England, assignor to Frank Thomas Seear, Ashtead, England Application September 29, 1947, Serial No. 776,835
In Great Britain October 24, 1946

7 Claims. (Cl. 33—19)

This invention relates to dividing apparatus such for instance as is used for the production of measuring rules and other scales.

It is the object of the invention to provide an improved form and construction of dividing apparatus which is particularly adaptable and can readily be used for producing scales having a rather involved relationship, e. g. inches and centimetres, without the necessity of using complicated calculations.

According to the invention a dividing apparatus is provided, comprising a rotatable dividing plate and an index member which latter is movable substantially at right angles to the rotating movement of the dividing plate so as to read upon a secondary scale having a plurality of spaced turns provided upon the dividing plate. Preferably the index member is caused to move in steps to traverse the secondary scale as the dividing plate makes a succession of complete revolutions.

As a further aspect of the invention a dividing apparatus is provided comprising a dividing plate mounted to be moved angularly about its axis, primary divisions extending circumferentially thereof, an index pointer co-operating with said primary divisions, secondary divisions extending substantially at right angles to the primary divisions, the lines defining said primary and secondary divisions being arranged to intersect, and means for traversing the index pointer along the secondary divisions as the index plate makes successive complete revolutions.

Conveniently the index pointer is traversed along the secondary scale by a ratchet and pawl mechanism intermittently advancing the index pointer as the plate finishes each complete revolution. Thus a projection on the dividing plate may deflect a pawl against resilient influence and, at a predetermined position of the plate release said pawl to advance the index pointer along the secondary scale. The ratchet and pawl mechanism may include a follower member which is mounted to be deflected by the projection if the plate is moved backwards, thus avoiding actuation of the ratchet and pawl mechanism. The index pointer may be attached to a carriage which is slidably mounted upon a guide to move the pointer along the secondary scale, the guide conveniently being disposed behind the index plate while the pointer is constituted by an arm extending radially across the front of the plate and attached at its outer end to the carriage.

According to another aspect of the invention there is provided in a machine for engraving linear scales, a rotatable dividing plate which is mounted to turn with a lead screw, and has a circumferential scale extending continuously through a plurality of complete turns arranged spirally, and an index member which shows the angular position of the plate, and is moved radially by rotation of said plate to co-operate with the various turns of the scale as the plate is rotated through a succession of revolutions. Preferably each complete turn of the dividing plate corresponds to an advance of a simple fraction of an inch (depending upon the pitch of the lead screw) and the continuous spiral scale is marked along its length in complex fractions, representing a linear scale other than simple inch fractions, e. g. millimetres.

The invention is illustrated by way of example in the accompanying drawings, in which.

Figure 1:
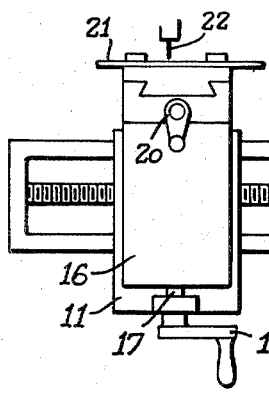
Figure 1 is a side elevation of part of an engraving machine with the improved dividing apparatus fitted.

The engraving machine, only the relevant parts of which are shown in Figure 1, comprises a horizontal guideway 10 along which a vertical saddle 11 is arranged to slide, this movement being effected by a horizontal lead screw 12 extending through a bearing collar 13 and fitted externally with a dividing plate 14 and a handle 15. The saddle 11 carries an angle bracket 16 which is moved up and down by a lead screw 17 and handle 18, said angle bracket 16 in turn serving as a horizontal slide for a work table 19 moved in a direction at right angles to the plane of the drawing by a handle 20. The work is indicated at 21 and the rotary engraving tool at 22. The work 21 is set up so that the required scale extends horizontally, parallel to the plane of the drawing so that the depth of cut is adjusted by the handle 18, each scale marking is made by operation of the handle 20 and the spacing between the markings is effected by turning the lead screw 12 through the requisite angle, thus moving the saddle 11 progressively along the guideway 10.

An index pointer 23 is provided for use in conjunction with the dividing plate 14 and is mounted upon a carriage 24 slidable radially upon a guide device 25, which latter is itself firmly carried by the bearing collar 13.

Figure 3:
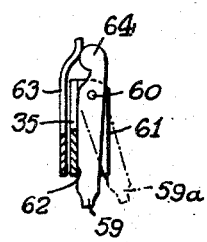
Figure 3 is a fragmentary sectional plan taken on the line 3—3 of Figure 2.
Figure 2:
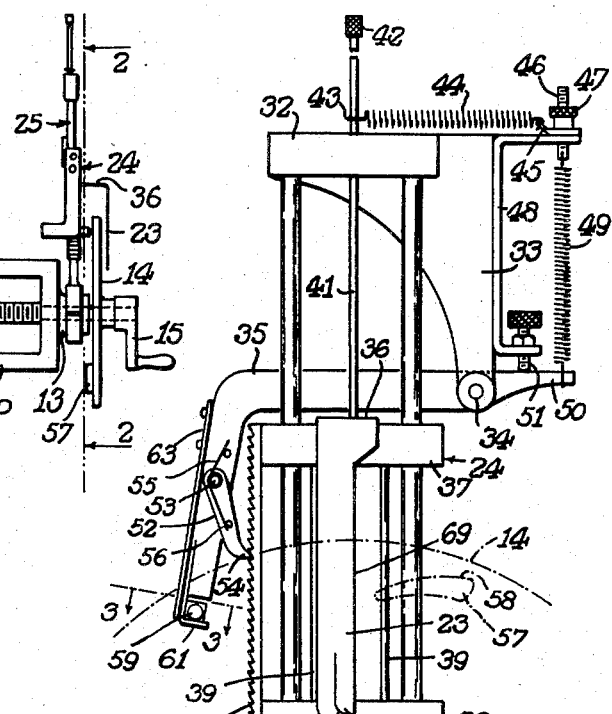
Figure 2 is a sectional elevation taken on the line 2—2 of Figure 1 and drawn to an enlarged scale, the dividing plate being indicated in broken lines.

The construction and arrangement of these parts is shown more clearly in Figures 2 and 3. The guide device 25 comprises a pair of mutually parallel rods 26 and 27 secured at their lower ends to a block 28, which is bored at 29 to fit over the bearing collar 13, said block 28 being slotted at 30 and having a clamping nut 31 to enable it to be firmly secured to the bearing collar 13. The upper ends of the rods 26 and 27 are held in spaced relationship by a transverse bar 32 serving to support a depending bracket 33 of substantially inverted L-shape, having at its lower extremity a bearing 34 for an operating lever 35. The carriage 24, to which the index pointer 23 is attached at its offset upper part 36, comprises upper and lower transverse members 37 and 38 connected together by a pair of vertical rods 39 and by a ratchet toothed rack member 40. The carriage 24 also has a vertical rod 41 which is slidable through the transverse bar 32 of the guide and has at its extremity a knob 42 by which the carriage 24 can be raised and lowered. To provide frictional restraint for this movement, however, the rod 41 passes through one eye 43 of a tension spring 44 which latter is anchored to the bracket 33 and is maintained under tension. For this purpose the spring 44 is attached to a tab washer 45 secured by a screw 46 and locking nut 47, to a substantially U-shaped strip 48 attached to the bracket 33, the lower end of the screw 46 serving also as an anchorage for a coiled tension spring 49 connected to the end portion 50 of the operating lever 35 so as to draw said end portion upwards into engagement normally with an adjustable stop screw 51.

The operating lever 35 is also of substantially inverted L-shape as is shown in Figure 2 and its depending limb is fitted with a pawl 52 which is pivoted to the lever at 53 and has its extremity 54 urged into engagement with the teeth of the rack member 40 by a leaf spring 55 acting against a pin 56 carried by the pawl. Thus as the operating lever 35 is raised the pawl 52 slips on the rack member 40 but it acts to drive the carriage 24 downwards as said lever returns under the force of the coiled tension spring 49, the applied downward force being sufficient to overcome the holding friction normally produced by the coiled tension spring 44. The operating lever 35 is moved upwards by a cam projection 57 mounted upon the rear surface of the index plate 14 and having an inclined cam surface 58 adapted to engage and press upwards the extremity of a follower member 59 fitted to the lower end of the lever 35. The follower member is arranged in the manner shown in Figure 3 so as to avoid moving the lever 35 if the index plate 14 is moved backwards i. e. clockwise as view in Figure 2. The follower member 59 is pivoted at 60 to a substantially horizontal portion 61 at the bottom of the lever 35 and it is normally urged into engagement with the part 62 of said lever by a somewhat L-shaped leaf spring 63 acting upon the extremity 64 of said follower member. During normal operation anti-clockwise rotation of the index plate 14 causes the projection 57 to move the follower member 59 obliquely upwards and leftwards about the pivot 34 so as to actuate the pawl 52, but if the plate 14 should be turned clockwise the follower member 59 is merely deflected say to the position shown in broken lines at 59a.

Figure 4:
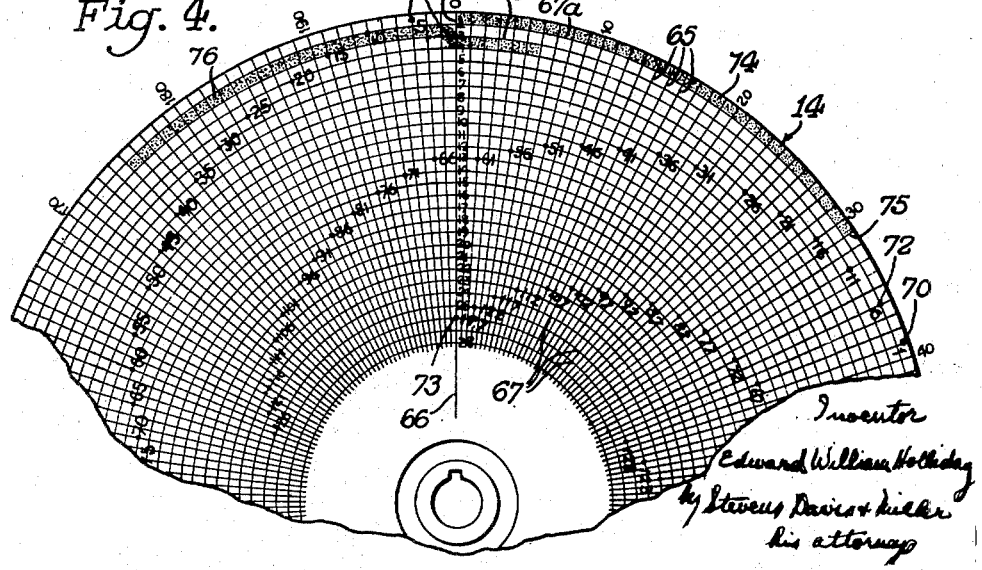
Figure 4 is a fragmentary front elevation of the dividing plate.

The index plate 14 is marked on its front surface in the manner shown in Figure 4 so as to enable scales of fractions of an inch and also millimetres to be made without changing the adjustment of the apparatus in any way. The lead screw 12 has five threads per inch and the dividing plate 14 is therefore inscribed with radial lines 65 dividing the circumference into 200 equal parts. These lines 65 extend practically to the centre of the disc and one of them 66 is chosen as the zero point. Each radius is intersected by a number of equally spaced concentric circles 67 which form virtually a secondary scale having its divisions numbered along the zero line 66 from the periphery inwards, the circumferential divisions produced by the radial lines 65 being regarded as the primary scale. The index pointer 23 is inscribed with an arrow 68 which registers with the periphery of the index plate 14 when the carriage 24 is fully raised to its starting position, the right hand edge 69 of the index pointer 23 then coinciding with the starting radius 66. As the index plate 14 is turned in an anti-clockwise direction, the extent to which the saddle 11 (and hence the work 21) is advanced, is denoted by the number of radial lines 65 which pass the index pointer 23, each of these divisions corresponding to 0.001″. As the amount of rotation approaches one complete revolution the cam projection 57 moves the operating lever 35 upwards, the ratchet 52 sliding up one tooth of the rack 40 so that as the said revolution becomes complete, the follower member 59 slips off the end of the cam projection 57 and pushes down the carriage 24 so that the arrow 68 of the index pointer 23 then coincides with the first inscribed concentric circle indicated at 67a; this circle, therefore, represents the second turn of the index plate 14. Similarly when this turn has been completed the index pointer 23 again moves downwards bringing the arrow 68 into register with the third circle 67b and then action continues, if necessary, until the innermost circle is reached. It will be seen that this provides on the dividing plate 14 a very long scale which is calibrated throughout in one-thousandths of an inch of work displacement so that special scales, even those involving complicated decimals of an inch, can be engraved by first plotting the requisite points on the dividing plate. Thus the dividing plate shown in Figure 4 is arranged for the production of a scale in millimetres. The first millimetre from the zero line 66 is indicated by a dot 70 on (or closely adjacent) the periphery of the disc, thus corresponding to 0.039″. Similarly points for 2, 3, 4 and 5 come on the outside of the dividing plate 14, the point for 5 millimetres being indicated at 71. In turning the plate 14 for the 6th millimetre division the zero line 66 is passed so the scale is switched to the first circumferential line 67a and the point for 6 millimetres appears at 72. This action continues until the 127th millimetres, the point for which lies (for all practical purposes) on the zero line 66 as indicated at 73. When this point is reached therefore, the rod 41 can be raised to bring the arrow 68 into register with the periphery or outer circle of the plate 14, thus enabling the scale to be continued to any length within the capacity of the lead screw 12.

The index plate 14, part of which is shown in Figure 4, can have its outer five rings coloured or otherwise distinctively marked in sections of predetermined angular extent so as to facilitate the engraving of scales involving ordinary fractions of an inch. For instance as shown in Figure 4, the annular area between the periphery of the index plate 14 and the first line 67a is coloured to form a strip 74 extending from the zero line 66 to the point 75 corresponding to 1/64 inch. The next three corresponding divisions of 1/64 inch are each coloured differently, the four colours then being repeated spiral-fashion until the end of five complete turns corresponding to one inch. The band corresponding to the thirteenth 64th is indicated at 76 and it will be seen that it changes over from the second turn to the third turn by an abrupt offset portion indicated at 77. When five complete turns have been made as indicated by the position of the arrow 68 the carriage 24 is, of course, raised to return the arrow 68 to its starting position.

It will be understood that the arrangement which has been described is given only by way of example and that various modifications may be made to suit requirements. The device is extremely simple and enables scales of many forms to be produced on engraving and like machines quickly and accurately by any machine engraver of average skill.

What I claim is:

1. A dividing apparatus comprising a feed screw, a rotary dividing plate secured thereto, said dividing plate having a primary scale extending circumferentially, a secondary scale extending radially and having scale division lines arranged circumferentially, an index member mounted for movement towards and away from the axis of the dividing plate, ratchet and pawl mechanism for moving the index member progressively towards said axis, and an actuating member movable with the dividing plate to operate the ratchet and pawl mechanism at the finish of each complete revolution of the dividing plate, and move the index member inwards through one division on the secondary scale.

2. A dividing apparatus comprising a feed screw, a rotary dividing plate secured thereto, said dividing plate having a primary scale extending circumferentially, a secondary scale extending radially, with scale division lines arranged circumferentially, an index member mounted for radial movement towards and away from the axis of the dividing plate, ratchet and pawl mechanism for moving the index member radially of the plate, and an actuating member movable with the dividing plate to operate the ratchet and pawl mechanism as the dividing plate reaches a predetermined position in each revolution, the ratchet and pawl mechanism thus moving the index member radially through one division on the secondary scale.

3. A dividing apparatus comprising a feed screw, a rotary dividing plate secured thereto, said dividing plate having a primary scale extending circumferentially, a secondary scale extending radially, with scale division lines arranged circumferentially, an index member mounted for radial movement towards and away from the axis of the dividing plate, a rack member with ratchet teeth mounted to move longitudinally as one with the index member, a pawl cooperating with the rack and arranged to advance said rack tooth by tooth, and an actuating member movable with the dividing plate to operate the pawl as the dividing plate reaches a predetermined position in each revolution, the pawl thus moving the index member radially through one division on the secondary scale.

4. A dividing apparatus comprising a feed screw, a rotary dividing plate secured thereto, said dividing plate having a primary scale extending circumferentially, a secondary scale extending radially, with scale division lines arranged circumferentially, an index member mounted for radial movement towards and away from the axis of the dividing plate, a rack member with ratchet teeth mounted to move longitudinally as one with the index member, an operating lever arranged to be deflected from a normal position, once during each revolution of the dividing plate, a spring acting upon the operating lever to return it to its normal position, and a pawl mounted upon the lever and disposed in engagement with the rack member to advance said rack member one tooth for each complete revolution of the dividing plate.

5. A dividing apparatus comprising a non-rotating guideway, a feed screw rotatably mounted therein, a rotary dividing plate secured to the feed screw, said dividing plate having a primary scale extending circumferentially, a secondary scale extending radially, with scale division lines arranged circumferentially, a pair of mutually parallel rods attached to the guideway, a carriage slidable upon said rods, an index member mounted upon said carriage for radial movement toward and away from the axis of the dividing plate, ratchet and pawl mechanism for moving the index member radially of the plate, and an actuating member movable with the dividing plate to operate the ratchet and pawl mechanism as the dividing plate reaches a predetermined position in each revolution, the ratchet and pawl mechanism thus moving the index member radially through one division on the secondary scale.

6. A dividing apparatus according to claim 5, having a control rod attached to the carriage and extending parallel with the said mutually parallel rods, and frictional restraining means acting upon said control rod.

7. A dividing apparatus according to claim 6, including a bearing through which the control rod is slidable, the frictional restraining means comprising a coiled tension spring slidably engaging the control rod and urging it laterally so that it bears frictionally against the spring and the bearing.

EDWARD WILLIAM HOLLIDAY.

REFERENCES CITED

The following references are of record in the file of this patent:

UNITED STATES PATENTS

| Number | Name | Date |
|---|---|---|
| 448,922 | Hope | Mar. 24, 1891 |
| 969,496 | Royle | Sept. 6, 1910 |
| 2,144,325 | Buchardt | Jan. 17, 1939 |

FOREIGN PATENTS

| Number | Country | Date |
|---|---|---|
| 414,430 | Germany | June 2, 1925 |